(12) United States Patent
Smarsch et al.

(10) Patent No.: US 10,053,785 B2
(45) Date of Patent: Aug. 21, 2018

(54) ELECTROLYSIS DEVICE AND METHOD FOR OPERATING AN ELECTROLYSIS DEVICE

(71) Applicant: H-TEC SYSTEMS GmbH, Lübeck (DE)

(72) Inventors: Svetlana Smarsch, Lübeck (DE); Nils Mantai, Lübeck (DE); Norbert Bülow, Lübeck (DE); Claus Würfel, Lübeck (DE); Dennis Wilken, Kastorf (DE); Uwe Küter, Lübeck (DE); Stefan Höller, Lübeck (DE)

(73) Assignee: H-TEC SYSTEMS GmbH, Lübeck (DE)

( * ) Notice: Subject to any disclaimer, the term of this patent is extended or adjusted under 35 U.S.C. 154(b) by 491 days.

(21) Appl. No.: 14/785,466

(22) PCT Filed: Apr. 14, 2014

(86) PCT No.: PCT/EP2014/057544
§ 371 (c)(1),
(2) Date: Oct. 19, 2015

(87) PCT Pub. No.: WO2014/170281
PCT Pub. Date: Oct. 23, 2014

(65) Prior Publication Data
US 2016/0068975 A1  Mar. 10, 2016

(30) Foreign Application Priority Data
Apr. 19, 2013  (EP) .................................... 13164529

(51) Int. Cl.
C25B 15/08 (2006.01)
C25B 1/10 (2006.01)
C25B 9/08 (2006.01)
C25B 1/04 (2006.01)
C25B 13/04 (2006.01)
(Continued)

(52) U.S. Cl.
CPC .................. C25B 9/08 (2013.01); C25B 1/04 (2013.01); C25B 1/10 (2013.01); C25B 13/04 (2013.01); C25B 15/02 (2013.01); C25B 15/08 (2013.01); C02F 1/001 (2013.01); C02F 1/42 (2013.01);
(Continued)

(58) Field of Classification Search
CPC ......................... C25B 15/08; C25B 1/02–1/12
See application file for complete search history.

(56) References Cited

U.S. PATENT DOCUMENTS

| 5,690,797 A | 11/1997 | Harada et al. |
| 2003/0141200 A1 | 7/2003 | Harada |
| 2012/0048731 A1* | 3/2012 | Haryu ....................... C25B 1/12 204/265 |

FOREIGN PATENT DOCUMENTS

EP  1 243 671 A1  9/2002

* cited by examiner

*Primary Examiner* — Nicholas A Smith
(74) *Attorney, Agent, or Firm* — McGlew and Tuttle, P.C.

(57) ABSTRACT

A method for operating an electrolysis device (2) for producing hydrogen uses a water circuit. Water from a polymer electrolyte membrane (PEM) electrolyzer (6) is cooled in a cooling device (10) and subsequently led to an ion exchanger (4) for processing the water. The water, after the processing in the ion exchanger (4), is fed to the PEM electrolyzer (6). Heat is removed from the water before feeding the water to the cooling device (10). A part of this removed heat is fed again to the water after the processing in the ion exchanger (4) and before entry into the PEM electrolyzer (6).

17 Claims, 1 Drawing Sheet

(51) Int. Cl.
*C25B 15/02* (2006.01)
*C02F 1/00* (2006.01)
*C02F 1/42* (2006.01)
*C02F 1/461* (2006.01)

(52) U.S. Cl.
CPC .................... *C02F 1/46104* (2013.01); *C02F 2201/46195* (2013.01); *Y02E 60/366* (2013.01)

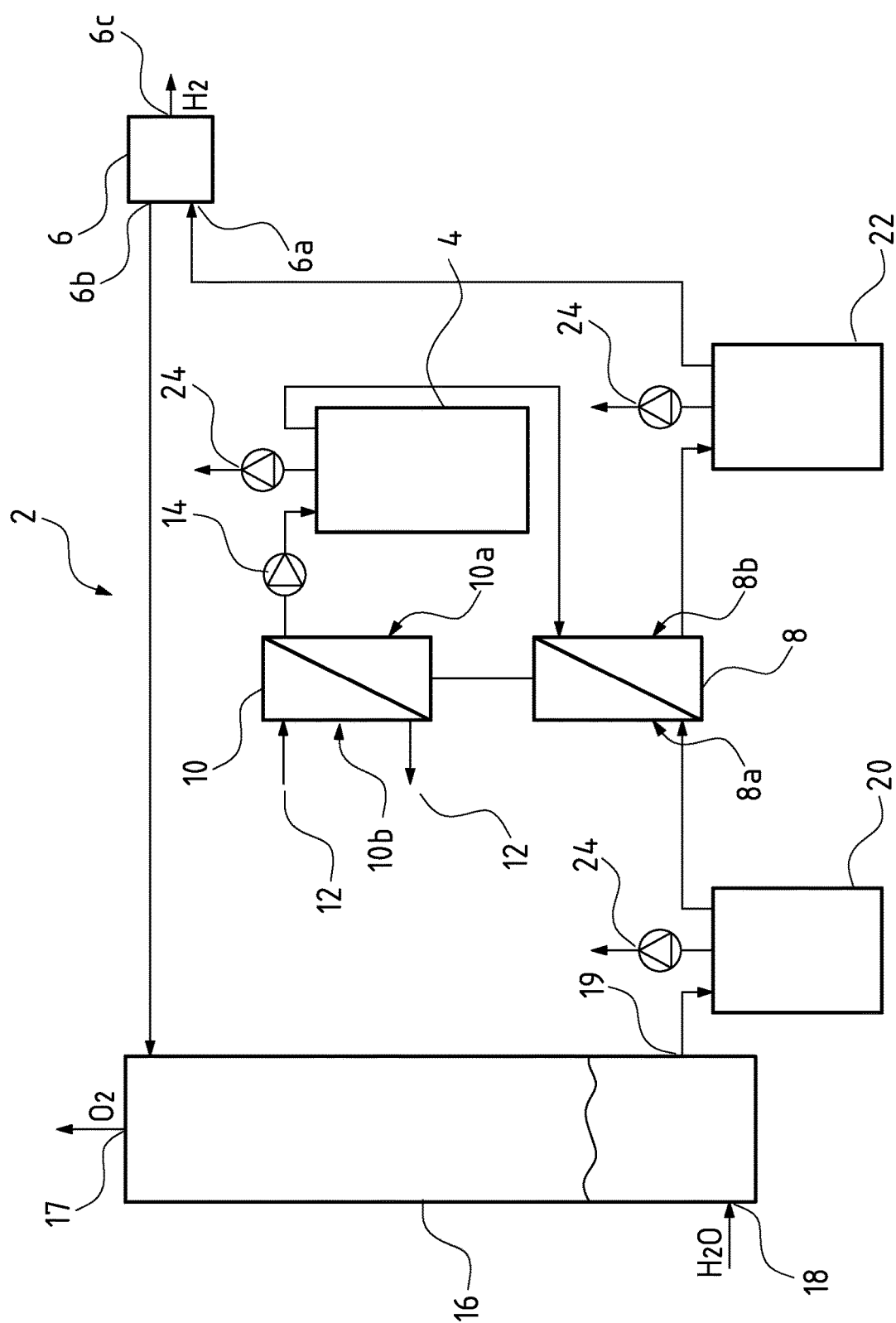

ELECTROLYSIS DEVICE AND METHOD FOR OPERATING AN ELECTROLYSIS DEVICE

CROSS REFERENCE TO RELATED APPLICATIONS

This application is a United States National Phase Application of International Application PCT/EP2014/057544 filed Apr. 14, 2014 and claims the benefit of priority under 35 U.S.C. § 119 of European Patent Application 13164529.3 filed Apr. 19, 2013 the entire contents of which are incorporated herein by reference.

FIELD OF THE INVENTION

The invention relates to a method for operating an electrolysis for producing hydrogen, with which in a water circuit, water from a polymer electrolyte membrane (PEM) electrolyzer is cooled in a cooling device and subsequently led to an ion exchanger for processing the water, and the water after the processing in the ion exchanger is led to a PEM electrolyzer. The invention also relates to an electrolysis device with a water circuit, in which a cooling device, an ion exchanger and a PEM electrolyzer are successively arranged.

BACKGROUND OF THE INVENTION

With electrolysis devices of the type being discussed here, and which operate with an electrolyzer with a polymer electrolyte membrane (PEM) and serve for the production of hydrogen, it is counted as belonging to the state of the art to lead the water, in particular distilled water which is necessary for the operation of the electrolyzer, in a circuit (circulation). Thereby, the water which exits from the PEM electrolyzer typically designed as a stack and which exits at the oxygen side, is firstly led back into a storage means and from there back to the stack. In order to protect the sensitive polymer electrolyte membrane from contamination, the water is freed from metal ions by way of an ion exchanger before entry into the electrolyzer, wherein these ions, even if only in small quantities, are present in the water exiting from the stack. The water fed to the ion exchanger on the one hand is cooled by way of a heat exchanger, and on the other hand warm, distilled water is drained and cold distilled water is fed into the circuit at regular intervals, due to the fact that the ion exchanger is heat-sensitive and can only be operated up to a temperature of approx. 60° C. In practice, this leads to about double the amount of distilled than would actually be required for operation of the PEM electrolyzer being led to into the circuit.

SUMMARY OF THE INVENTION

Against this background, it is an object of the invention to improve a method according to a known type, to the extent that on the one hand it can be operated with a reduced quantity of distilled water and on the other hand the effectiveness of the method is increased. A device with which the method can be carried out is also to be provided.

The part of this object with regard to the method is achieved by a method with the features according to the method of the invention, and an electrolysis device for carrying out this method. Advantageous further developments of the method according to the invention as well as of the electrolysis device are described herein.

The method according to the invention, for operating an electrolysis device for producing hydrogen, operates with a water circuit, in which water exiting from the PEM electrolyzer is cooled in a cooling device and is subsequently treated in an ion exchanger for processing the water, before it is led again to the PEM electrolyzer. According to the invention, heat is removed from the water before feeding to the cooling device, wherein a part of this removed heat is fed to the water after the processing in the ion exchanger and before entry into the PEM electrolyzer.

The basic concept of the method according to the invention is to feed at least a part of the heat which is removed from the water led in the circuit, before the entry into the ion exchanger, back again after the exit from the ion exchanger and before entry into the PEM electrolyzer. The efficiency of the method is increased to a considerable extent by way of this, on the one hand by way of improving the thermal balance, specifically by way of utilizing a part of the heat which is otherwise wasted by dissipation before entry into the ion exchanger, in order to heat the water before entry into the PEM electrolyzer, and on the other hand by way of a significant reduction of the quantity of the distilled water necessary for the process. Moreover, the effectiveness of the electrolysis process can be very significantly increased by way of heating the water exiting the ion exchanger, before entry into the PEM electrolyzer, without thermally overloading the ion exchanger by way of this.

The basic concept of the present invention is therefore to adapt the temperature in the water circuit, in a manner such that the subsequent process step in the water circuit takes place under designated conditions and the energy expense for temperature adaptation is simultaneously kept low. The ion exchanger operates in the designated manner when the water in the ion exchanger has a temperature of below a limit temperature. The limit temperature lies at about 60° C. with ion exchangers which are presently common. The PEM electrolyzer operates most effectively when the water has an as high as possible temperature below the boiling point. This region is between about 70° C. and 80° C. with the present technical state of the art. According to the invention, such a temperature change is achieved by way of the feeding the heat which is removed from the water to be cooled, to the water which is to be heated.

The water which is fed to the cooling device however is particularly preferably led in a manner separated by channel, but thermally conductive manner and in a counterflow, with the water coming from the ion heat exchanger. An increased thermal exchange is rendered possible due to the opposite direction of the two fluid flows. The two water flows are in a thermally conductive connection. Both water flows should not mix, since the water exiting from the ion exchanger has a greater degree of purity than the water before feeding to the cooling device, which is why a channel separation is envisaged.

The water is preferably fed to the PEM electrolyzer at a temperature of at least 65° C., preferably between 70° C. and 80° C. The water must be present in its liquid phase, so that it can be broken down into hydrogen and oxygen in a PEM electrolyzer. In this respect, it is necessary for the water to be present below its boiling point. Thereby, one should consider the fact that the saturation vapour pressure is dependent on the temperature and on the pressure in the PEM electrolyzer. The water molecules are easier to electrolytically break down if the water has an as high as possible temperature. This increases the efficiency of the PEM electrolyzer.

Further advantageously, the water which is fed to the ion exchanger is cooled to a temperature of below or to 60° C. In the water circuit, at least a part of the water evaporated in the PEM electrolyzer, for example as a mixture of water molecules and oxygen, is also led again to the water circuit. The heat of the water which is thus led back then transfers into the water circuit. The temperature of the water as a whole can therefore be lifted during operation. For this reason, the water is advantageously cooled before entry into the ion exchanger, at least to a temperature, below which the ion exchanger operates effectively. This further increases the efficiency of the electrolysis device.

In the electrolysis device according to the invention, a cooling device, an ion exchanger and a PEM electrolyzer are arranged successively in a water circuit. According to the invention, a heat exchanger is arranged in the water circuit and whose one side is connected upstream of the cooling device and whose other side is connected after the ion exchanger.

The device according to the invention implements the basic concept of the invention. This implementation is achieved technically by way of at least one heat exchanger. By way of introducing the water into one side of the heat exchanger before feeding to the cooling device, a part of the heat can be released to the water which is led at the other side of the heat exchanger after exit from the ion exchanger. The heat exchangers have a very high efficiency. Thus the heat which is taken from the water before feeding to the cooling device is efficiently fed to the water after the exit from the ion exchanger and before the entry into the PEM electrolyzer. Thus the total energy effort for operating the device can be reduced. It can be useful for more than one heat exchanger to be installed, depending on the design and the technical demands placed upon the electrolysis device.

The water circuit preferably comprises at least one filter. The filter serves for removing particles and small parts from the water in the water circuit, which for example could block the channels in the PEM electrolyzer or as catalytic poisons could comprise the catalytic process in the PEM electrolyzer. The purity of the water is increased by way of the at least one filter.

Particularly preferably, the water circuit comprises at least one first filter and a second filter, wherein the first filter is arranged in the water circuit upstream of the ion exchanger, and the second filter is arranged in the water circuit upstream of the PEM electrolyzer. The first filter for example can serve for removing catalytic poisons. It is thereby preferably the case of an active charcoal filter, with the help of which the filtering of the catalytic poisons is effected. The filter can also comprise catalyzer substances, e.g. in the form of coatings, alternatively or complementarily to the active charcoal. The catalytic poisons can thereby be converted in the filter or be held back by way of accumulating on the filter surface and thus be removed from the water. The first filter can be designed such that the filter effect is increased by way of applying a voltage. The second filter is preferably designed as a particle filter, in order to filter particles which could reduce the performance of the PEM electrolyzer, for example by way of blocking channels, out of the water. The first filter is particularly advantageously not only arranged upstream of the ion exchanger but also upstream of the cooling device and upstream of the heat exchanger.

At least one circulation pump ensuring a circulation of the water in the circuit is preferably provided within the water circuit. Such a circulation pump is usefully lined with plastic in regions leading fluid, in order to withstand the aggressive medium of the distilled water. With regard to such a circulation pump, it is advantageous to arrange this in the water circuit between the cooling device and the ion exchanger, since the lowest temperature level prevails here and thus the operation of the circuit pump is particularly favorable, in particular if the parts leading fluid are coated with plastic or consist of plastic. The pump can be operated in a temperature range of approx. 60° C., which is advantageous.

Preferably, at least one filter and/or an ion exchanger comprises a bleed device in the electrolysis device. The gas which has accumulated in the at least one filter and/or the ion exchanger is separated from the water circuit via such bleed devices.

A storage tank is preferably provided in the water circuit of the electrolysis device, preferably downstream of the PEM electrolyzer and upstream of the heat exchanger, in the flow direction. Water is accumulated in the storage tank, and distilled water added if required, in the water circuit. This can ensure the continuous operation of the electrolysis device, since an adequate volume of water is present due to the storage tank. The electrolysis device can also have a suitably voluminously designed pipe system for the water circuit, alternatively or supplemenarily to the storage tank.

The water circuit, preferably the storage tank advantageously comprises an inflow, via which water can be fed into the water circuit. Water is broken down into its constituents in the PEM electrolyzer. The water is therefore consumed. After a certain time, the water quantity in the water circuit is reduced to such an extent that a continuous flow of water would no longer be ensured, even with a storage supply of water in a storage tank or by way of a suitably designed pipe system. A feeding of water in the water circuit is thus periodically necessary, in order to be able to permanently ensure the operation of the electrolysis device. The water which is fed is thereby distilled and as pure as possible.

The PEM electrolyzer in the electrolysis device particularly preferably comprises at least one entry for the water feed, an exit for hydrogen and an exit for an oxygen-water mixture, wherein the entry for the water feed and the exit for the oxygen-water mixture are parts of the water circuit. The water is introduced into the electrolyzer via the entry at the PEM electrolyzer. The PEM electrolyzer, in which a part of the water molecules are split up into oxygen and hydrogen ions, is supplied with water at least at the anode side of the proton-permeable membrane. The PEM electrolyzer at the cathode side of the proton-permeable membrane, at which the molecular hydrogen arises, can be flooded with water or not, depending on the construction of the PEM electrolyzer. Thus a mixture of water and oxygen is led out of the PEM electrolyzer via the exit for oxygen, wherein the water remains in the water circuit of the electrolyzer device, and the oxygen is released to the surroundings. The exit for the hydrogen can be designed such that the hydrogen is collected and/or that the hydrogen is led fed to a subsequent treatment. Water, for example, can also be led out in the form of water vapour via the exit for hydrogen, if the PEM electrolyzer is filled with water at the cathode side. The exit for the oxygen-water mixture is particularly preferably conductively connected to the storage tank. The mixture of oxygen and water is the fed to the storage tank. The heated water is therefore fed to a further utilization in the device.

The storage tank is advantageously designed for gas-water separation, and a gas separator which leads away the oxygen out of the water circuit is provided. The electrolysis device thus not only produces hydrogen as an end product, but also oxygen which, as the case may be, can also be collected and/or led to further utilization.

The cooling device furthermore preferably comprises a heat exchanger whose one side lies in the water circuit and whose other side is conductively connected to a cooling system. The cooling system thereby in its simplest form can be implemented by way of the connection of the heat exchanger to a service water conduit and by way of leading away the heated service water out of the heat exchanger into a discharge channel. The cooling medium is hereby service water. Alternatively, it is possible to design the cooling system as a cooling circuit, wherein the cooling medium for example is thermoelectrically cooled and is fed to the heat exchanger. The heat exchanger is advantageously a plate heat exchanger. The cooling medium can be led in a counterflow to the water in the circuit, in a manner separated by channel. The distilled water which is cooled in the water circuit by way of the cooling system, via the heat exchanger as part of the cooling device can dissipate the heat to the cooling medium of the cooling system with a high efficiency.

The heat exchanger is advantageously a heat plate heat exchanger, in which the water which is fed to the ion exchanger and the water coming from the ion exchanger are separated by channel in a counterflow and thermally conductively connected to one another. A plate heat exchanger permits a very efficient exchange of the heat between the two water flows. The operation of the plate heat exchanger with counterflows of the two water flows thereby further increases the efficiency of the heat exchanger. An intensive exchange of the heat between the two water flows is achieved by way of this.

The invention is hereinafter explained in more detail by way of one embodiment example which is represented in the drawing. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:
FIG. 1 is a basic representation of an electrolysis device according to the invention.

DESCRIPTION OF THE PREFERRED EMBODIMENTS

An electrolysis device 2 comprises a water circuit, in which a PEM electrolyzer 6, a storage tank 16, a first heat exchanger 8 in the form of a plate heat exchanger, a second heat exchanger 10 and an ion exchanger 4 are conductively connected in a successive manner in the flow direction. The first warm side 8a of the first heat exchanger 8 is conductively connected at the exit side to the entry of the first warm side 10a of the second heat exchanger 10. The first warm side 10a of the second heat exchanger 10 at the exit side is conductively connected to the ion exchanger 4. The second cold side 8b of the first heat exchanger 8 is conductively connected to the exit of the ion exchanger 4 and is thus arranged downstream of this. The second cold side 8b of the heat exchanger 8 via a conduit of the water circuit connects to an entry 6a for water of the PEM electrolyzer 6.

The PEM electrolyzer thereby consists of several electrolysis cells which are designed as a cell stack or simply stack. The PEM electrolyzer 6 apart from the entry 6a for water comprises an exit 6b for an oxygen-water mixture and an exit 6c for hydrogen. The exit 6b for the oxygen-water mixture is arranged at the anode side in the PEM electrolyzer 6. This anode-side exit 6b is conductively connected to the storage tank 16 and in the water circuit leads water as well as molecular oxygen to the storage tank 16. The exit 6c for hydrogen of the PEM electrolyzer 6 is arranged at the cathode side and hydrogen is led away out of the PEM electrolyzer 6 via it.

The storage tank 16 comprises an additional inlet 18, via which distilled water can be fed into the storage tank 16 and thus water can be fed into the water circuit. The storage tank 16 is moreover designed in a manner such that oxygen which is fed from the PEM electrolyzer 6 as a mixture with water (in liquid and/or gaseous form) to the storage tank 16 is led away out of the storage tank 16 via an exit 17. The storage tank 16 is conductively connected to the first cold side 8a of the heat exchanger 8 in the water circuit via an exit 19.

The second heat exchanger 10 is likewise a plate heat exchanger. The second cold side 10b of the second heat exchanger 10 is conductively connected to a cooling water system at the entry side as well as at the exit side, said cooling water system having service water as a coolant.

A filter 20 is arranged between the exit 19 of the storage tank 16 and the first warm side 8a of the first heat exchanger 8. Moreover, a second filter 22 is arranged between the second cold side 8b of the first heat exchanger 8 and the entry 6a for water of the PEM electrolyzer. Amongst other things, catalytic poisons which could at least reduce the catalytic effect for example of the precious metal electrodes of the PEM electrolyzer 6 which are arranged in the electrolysis cells, are filtered out of the water of the circuit in the first filter 20. The first filter 20 advantageously comprises active charcoal and/or catalyzer substances, with which the catalytic poisons interact and are thus converted and/or collect on the surface of the catalyzer substances. The catalytic poisons are thus removed from the water. Thus, a first processing of the water takes place in the circuit upstream of the ion exchanger 4. Particles which for example could block the channels in the stack of the PEM electrolyzer 6 are filtered out in the second filter 22. The purity of the water is thus further improved.

A circulation pump 14 is arranged between the first warm side 10a of the second heat exchanger 10 and the entry of the ion exchanger 4. It ensures the necessary through-flow of the water through the water circuit. The pump 14 is lined with plastic.

A bleed device 24 is arranged in each case on the first filter 20, the second filter 22 and the ion exchanger 4. The bleed devices 24 comprises pumps. Thus, gases which have accumulated in the first filter 20, in the second filter 22 and/or in the ion exchanger 4 can be discharged via the bleed devices 24.

At least a part of the heat can be transferred from the water flow at the warm side onto the water flow at the cold side by way of the arrangement of the first heat exchanger 8 with its first warm side 8a upstream of the ion exchanger 4, and its second cold side 8b downstream of the ion exchanger 4. The water from the first warm side 8a of the first heat exchanger 8 is cooled in the second heat exchanger 10 to 60° C. or below, which represents the upper limit temperature for the efficient utilization of the ion exchanger 4. Thus, the water which is fed to the PEM electrolyzer 6 can be efficiently heated to a temperature, at which the PEM electrolyzer 6 can efficiently operate, by way of a recovery of the heat from the water flow to be cooled to the water flow to be heated, in the first heat exchanger 8.

While specific embodiments of the invention have been shown and described in detail to illustrate the application of the principles of the invention, it will be understood that the invention may be embodied otherwise without departing from such principles.

The invention claimed is:

1. A method for operating an electrolysis device (2) for producing hydrogen, the method comprising the steps of:
   cooling, in a cooling device in a water circuit, water from a polymer electrolyte membrane (PEM) electrolyzer;
   subsequently leading the cooled water led to an ion exchanger for processing;
   leading the water, after the processing in the ion exchanger to the PEM electrolyzer; and
   feeding a portion of heat removed from the water, before the feeding to the cooling device back to the water after the processing in the ion exchanger and before entry into the PEM electrolyzer.

2. A method according to claim 1, wherein the water fed to the cooling device is led in a thermally conductive manner with the water coming from the ion exchanger, and in a manner separated by channel in a counterflow.

3. A method according to claim 1, wherein the water is fed to the PEM electrolyzer at a temperature of at least 65° C.

4. A method according to claim 1, wherein the water fed to the ion exchanger is cooled to a temperature that is less than or equal to 60° C.

5. An electrolysis device comprising:
   a water circuit;
   a cooling device;
   an ion exchanger;
   a polymer electrolyte membrane (PEM) electrolyzer the cooling device, the ion exchanger and the PEM electrolyzer being successively arranged in the cooling circuit; and
   at least one heat exchanger arranged in the water circuit, one side of said heat exchanger being connected upstream of the cooling device and another side of said heat exchanger being connected downstream the ion exchanger.

6. An electrolysis device according to claim 5, wherein the water circuit comprises at least one filter.

7. An electrolysis device according to claim 6, wherein the water circuit comprises:
   at least one first filter; and
   a second filter, wherein the first filter is arranged in the water circuit upstream of the ion exchanger, and the second filter is arranged in the water circuit upstream of the PEM electrolyzer.

8. An electrolysis device according to claim 5, further comprising at least one pump arranged in the water circuit, preferably between the cooling device and the ion exchanger.

9. An electrolysis device according to claim 6, wherein the at least one filter comprises a bleed device.

10. An electrolysis device according to claim 5, further comprising a storage tank arranged in the water circuit, preferably downstream of the PEM electrolyzer and upstream of the heat exchanger.

11. An electrolysis device according to claim 5, wherein the PEM electrolyzer comprises at least one entry for the water feed, an exit for hydrogen and an exit for an oxygen-water mixture, wherein the entry for the water feed and the exit for the oxygen-water mixture are parts of the water circuit.

12. An electrolysis device according to claim 11, wherein the exit for the oxygen-water mixture is conductively connected to the storage tank.

13. An electrolysis device according to claim 5, wherein the cooling device comprises a heat exchanger with one side B of the heat exchanger conductively connected to the water circuit and with another side of the heat exchanger conductively connected to a cooling system.

14. An electrolysis device according to claim 5, wherein the at least one heat exchanger is a plate heat exchanger, in which the water fed to the ion exchanger and the water coming from the ion exchanger are connected to one another in a thermally conductive manner in a counterflow.

15. An electrolysis device according to claim 8, wherein the at least one pump is arranged in the water circuit between the cooling device and the ion exchanger.

16. An electrolysis device according to claim 5, wherein the ion exchanger comprises a bleed device.

17. An electrolysis device according to claim 10, wherein the storage tank is arranged in the water circuit downstream of the PEM electrolyzer and upstream of the heat exchanger.

* * * * *